United States Patent [19]

Romenesko

[11] Patent Number: 5,412,014

[45] Date of Patent: May 2, 1995

[54] FIRE RETARDANT RESIN COMPOSITIONS

[75] Inventor: David J. Romenesko, Midland, Mich.

[73] Assignee: Dow Corning Corporation, Midland, Mich.

[21] Appl. No.: 142,757

[22] Filed: Oct. 26, 1993

Related U.S. Application Data

[63] Continuation-in-part of Ser. No. 906,165, Jun. 29, 1992.

[51] Int. Cl.$^6$ ................................................ C08K 3/32
[52] U.S. Cl. .................................... 524/416; 524/414; 524/140; 524/141; 524/142; 524/143; 524/148; 524/506
[58] Field of Search ............... 524/416, 414, 140, 141, 524/142, 143, 148, 506

[56] References Cited

U.S. PATENT DOCUMENTS

| | | | |
|---|---|---|---|
| 3,365,517 | 1/1968 | Barth | 260/860 |
| 3,423,479 | 1/1969 | Hendricks | 260/824 |
| 3,737,479 | 6/1973 | Haaf | 260/824 |
| 3,824,208 | 7/1974 | Link | 260/375 |
| 3,920,770 | 11/1975 | Nakashio | 260/897 |
| 4,387,176 | 6/1983 | Frye | 524/268 |
| 4,500,659 | 2/1985 | Kroupa | 523/213 |
| 4,536,529 | 8/1985 | Frye | 524/284 |
| 4,548,979 | 10/1985 | Weise | 524/403 |
| 4,663,397 | 5/1987 | Morita | 525/398 |
| 4,671,454 | 8/1988 | Obe | 524/862 |
| 4,778,860 | 10/1988 | Morita | 525/431 |
| 4,871,795 | 10/1989 | Pawar | 524/267 |
| 4,880,882 | 11/1989 | Morita | 525/446 |
| 4,888,390 | 12/1989 | Liang | 252/189 |
| 4,898,898 | 2/1990 | Fitzgerald | 523/351 |
| 5,017,637 | 5/1991 | Smith | 524/354 |
| 5,064,887 | 11/1991 | Yamamoto | 324/145 |
| 5,153,238 | 10/1992 | Bilgrien | 523/211 |
| 5,204,395 | 4/1993 | Lupinski | 524/265 |

FOREIGN PATENT DOCUMENTS

| | | |
|---|---|---|
| 393959 | 4/1990 | European Pat. Off. . |
| 59174 | 2/1990 | Hungary . |
| 102007 | 4/1990 | Japan . |

OTHER PUBLICATIONS

Hoechst Celanese Product Literature re: Exolit (R) Flame Retardant (1991).

*Primary Examiner*—Ralph H. Dean
*Attorney, Agent, or Firm*—Alexander Weltz

[57] ABSTRACT

A free-flowing silicone polymer powder, said powder having an average particle size of 1 to 1000 microns and being prepared by mixing a polydiorganosiloxane with a silica filler, and a phosphorus-based fire retardant compound are uniformly dispersed in an organic resin using conventional equipment, such as a single screw extruder. The resulting resin composition shows a significant improvement in fire retardancy but does not exhibit the severe deterioration of impact resistance incurred when the resin is modified with only phosphorus-based fire retardant.

24 Claims, No Drawings

FIRE RETARDANT RESIN COMPOSITIONS

This is a continuation-in-part of application Ser. No. 07/906,165, filed on Jun. 29, 1992.

FIELD OF THE INVENTION

The present invention relates to fire retardant organic thermoplastic and thermoset resin compositions. More particularly, the invention relates to said organic resins which have been modified with a silicone polymer powder and a phosphorus-based fire retardant.

BACKGROUND OF THE INVENTION

Industrial utilization of plastics, particularly the so-called engineering thermoplastics, has greatly increased over the past several decades. These materials have found their way into such diverse applications as home and office furniture, airplane interiors, cabinetry and casing for electronic and computer systems and various components for automobiles, machines and cookware, inter alia.

Designers employing the plastic materials place a high premium on fire retardancy since accidental fires continue to extract a heavy toll on life and property. In this regard, the thermoplastic and thermosetting resins are less than satisfactory due to their organic (i.e., inherently combustible) nature. This deficit has been addressed, most notably by incorporating various halogen or phosphorous fire retardant compounds in the plastic composition. A hydrated metallic compound, such as a hydrated alumina filler can also be used as fire retardant component, either by itself or in combination with the aforesaid compounds. Unfortunately, such tactics present disadvantages of their own in that the addition of such fire retardant components generally detracts from the desirable mechanical properties of the plastics. Thus, for example, it is known that phosphorus-based fire retardant additives enhance the fire retardant character of various plastics when incorporated therein. Such modified products can achieve a desirable V-0 rating on a standard Underwriters Laboratories UL-94 flame test, but it has been found that the amounts of additive required severely degrade the impact resistance of the compositions relative to the virgin resins.

The need for modified plastic systems which place less reliance on the above mentioned conventional means to achieve fire retardant properties has been partially addressed, as exemplified by the disclosure of Romenesko et al. in a copending application for patent Ser. No. 906,165, filed on Jun. 29, 1992 and hereby incorporated by reference. In this disclosure, the use of a silicone polymer powder to modify organic resins resulted in systems which exhibited significantly lower rates of heat generation and reduced smoke and carbon monoxide formation relative to the unmodified controls. And, as pointed out in the application to Romenesko et al., it has been well documented that these are the predominant elements responsible for death and injury in a real fire situation.

All of the above mentioned improvements in the modification of plastic resins notwithstanding, there is still a need for plastic materials having a high degree of fire retardancy while still retaining good mechanical properties.

SUMMARY OF THE INVENTION

It has now been discovered that organic resins having good fire retardant properties as well as good mechanical properties can be prepared by incorporating both a phosphorus-based fire retardant and the above mentioned silicone polymer powder therein. Surprisingly, the impact resistance of the modified resin, normally deteriorated by the inclusion of a phosphorus-based fire retardant, is brought back to nearly the value observed for the unadulterated resin. Additionally, a blend of the silicone polymer powder and the phosphorus-based fire retardant can be readily dispersed in various resins using conventional process equipment, such as a single screw or, preferably, a twin screw extruder. This offers a significant advantage to a plastics manufacturer since both resin and modifying ingredients can be handled as free-flowing solid feeds and are therefore amenable to facile introduction to mixing equipment (e.g., from a hopper).

The present invention therefore relates to a composition comprising:
(A) 100 parts by weight of an organic resin selected from the group consisting of organic thermoplastic resins and organic thermoset resins;
(B) from 0.5 to 25 parts by weight of a silicone polymer powder, said silicone polymer powder having an average particle size of 1 to 1000 microns and comprising
   (i) 100 parts by weight of a polydiorganosiloxane polymer, and
   (ii) from 10 to 150 parts by weight of a silica filler; and
(C) from 5 to 80 parts by weight of a phosphorus-based fire retardant.

The present invention further relates to a method for imparting fire retardancy to an organic resin by thoroughly dispersing a phosphorus-based fire retardant and said silicone polymer powder therein.

DETAILED DESCRIPTION OF THE INVENTION

The organic thermoplastic or organic thermosetting resin (A) of the present invention is well known in the art and may be a homopolymer or copolymer of any such conventional system. Those skilled in the art will readily recognize that the term "organic resin" specifically excludes organosiloxane (silicone) resins, these latter materials being classified as intermediate between organic and inorganic systems. Preferably, this component is a thermoplastic selected from polystyrene, high impact polystyrene, polypropylene, polycarbonate or poly(phenylene ether). Examples of other thermoplastics which may be modified according to the present invention are polysulfones, poly(phenylene sulfide), acrylonitrile-butadiene-styrene copolymers, nylons, acetal, polyethylene and copolymers thereof, poly(ethylene terephthalate), poly(butylene terephthalate), acrylics, fluoroplastics, thermoplastic polyesters, inter alia.

Examples of thermosetting resins which can be modified according to the instant invention include such systems as phenolics, epoxies, urethanes, unsaturated polyesters, polyimides, melamine formaldehyde and urea, among others.

Component (B) of the present invention is a silicone polymer powder which comprises 100 parts by weight of one or more polydiorganosiloxanes (i) blended with about 10 to about 150 parts by weight of silica filler (ii).

This component is described in U.S. Pat. No. 5,153,238 to Bilgrien et al., said patent being assigned to the assignee of the present invention and hereby incorporated by reference.

The polydiorganosiloxane (i) used in the preparation of silicone polymer powder (B) is a fluid or high consistency polymer or copolymer. Preferably, component (i) has the consistency of a gum and contains at least one functional group selected from the group consisting of hydroxyl and vinyl, in its molecule. The molecular weight of this polymer is sufficient to impart a viscosity of from about 100 to about 100,000,000 mPa·s (centipoise) to the polymer at 25° C. An alternate characterization of the viscosity of the polydiorganosiloxane gums utilized in the present invention is the "Williams plasticity number," as determined by the American Society for Testing and Materials (ASTM) test method 926. The plasticity number, as used herein, is defined as the thickness in millimeters $\times 100$ of a cylindrical test specimen 2 cm$^3$ in volume and approximately 10 mm in height after the specimen has been subjected to a compressive load of 49 Newtons for three minutes at 25° C. The high consistency polydiorganosiloxanes contemplated herein preferably have a Williams plasticity of about 150 to about 500.

The organic groups of the polydiorganosiloxane (i) are independently selected from hydrocarbon or halogenated hydrocarbon radicals such as alkyl and substituted alkyl radicals containing from 1 to 20 carbon atoms; alkenyl radicals, such as vinyl and 5-hexenyl; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, component (i) is a polydimethylsiloxane which is terminated with a vinyl group at each end of its molecule and/or contains at least one vinyl group along its main chain.

Methods for preparing fluid or high consistency (gum) polydiorganosiloxanes are sufficiently well known that they do not require a detailed discussion in this specification. For example, a typical method for preparing these polymers comprises the acid-or base-catalyzed polymerization of cyclic diorganosiloxanes.

Component (ii) of the silicone polymer powder (B) is a finely divided filler derived from fumed, precipitated or mined forms of silica. The former two fillers are typically characterized by surface areas greater than about 50 m$^2$/gram. The fumed form of silica is a preferred reinforcing filler based on its surface area, which can be as high as 900 m$^2$/gram, but preferably has a surface area of 50 to 400 m$^2$/gram. When the less preferred mined silica (e.g., MINUSIL TM) is employed, it should be combined with at least an equal weight of a fumed or precipitated silica.

For the purpose of the present invention, the silica filler is preferably treated by reaction with a liquid organosilicon compound containing silanol groups or hydrolyzable precursors of silanol groups. Compounds that can be used as filler treating agents, also referred to as anti-creping agents, include such components as low molecular weight liquid hydroxy- or alkoxy- terminated polydiorganosiloxanes and hexaorganodisilazanes. The silicon-bonded hydrocarbon radicals in all or a portion of the filler treating agent can contain substituents such as carbon-carbon double bonds. It is preferred that the treating compound is an oligomeric hydroxy-terminated polydimethylsiloxane having an average degree of polymerization (DP) of 2 to about 100. A highly preferred treating fluid of this type has a DP of about 2 to about 10.

The silica filler used in the present method is preferably reacted with about 10 to about 45 weight percent, based on filler weight, of the filler treating agent prior to being blended with the polydiorganosiloxane to form the silicone polymer powder (B). Treatment of the filler can be carried out in the same mixing vessel used to prepare the silicone polymer powder. The silica or other reinforcing filler is preferably maintained at a temperature greater than 100° C. to about 200° C. during the treatment process. Alternatively, the filler can be treated while it is being blended with the high consistency polydiorganosiloxane during preparation of the silicone polymer powder. In accordance with a preferred embodiment of the present method, the filler treating agent is sprayed into the mixing chamber during blending of the reinforcing filler with the polydiorganosiloxane, while the filler and polydiorganosiloxane are in the highly turbulent, fluidized state characteristic of the present method.

In highly preferred embodiments of the present invention, an alkoxysilane adhesion promoter (iii) is also incorporated in the silicone polymer powder composition. This alkoxysilane adhesion promoter contains at least one alkoxy group having 1 to 4 carbon atoms and at least one group selected from epoxy, acryloxy, methacryloxy, vinyl, phenyl or N-beta-(N-vinylbenzylamino)ethyl -gamma-aminoalkyl hydrochloride in its molecule. Preferred alkoxysilane adhesion promoters have the general formula

QSi(OMe)$_3$ wherein Me hereinafter denotes a methyl radical and Q is selected from the group consisting of an epoxyalkyl group, an acryloxyalkyl group, a methacryloxyalkyl group, a vinyl group, a phenyl group and an N-beta-(N-vinylbenzylamino)ethyl-gamma-aminoalkyl monohydrogenchloride group. Specific examples of such alkoxysilanes include gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

When the alkoxysilane adhesion promoter is employed, it is added at a level of about 0.5 to about 15 parts by weight for each 100 parts by weight of said silicone polymer powder, the addition being preferably carried out after the polydiorganosiloxane and treated silica filler have been mixed, as further described infra.

The silicone polymer powder (B) may be prepared in any mixing apparatus capable of maintaining the reinforcing filler in a fluidized state while blending the filler with the high consistency polydiorganosiloxane and applying sufficient shear to reduce the size of the resultant filler-impregnated polymer particles to a uniform powder having an average particle size of about 1 to about 1000 microns. Suitable mixers include, but are not limited to, Waring ™ blenders having a high speed shearing blade at the bottom of a vertically oriented conical chamber and mixers manufactured by Rheinstahl Henschel AG, Kassel, Germany.

Mixer/granulators manufactured by Littleford Bros. Inc. Florence, Ky. are preferred mixing devices. These mixers are referred to as "plow" or "plowshare" mixers due to the presence of at least one plow or "T"-shaped blade located in a horizontally oriented cylindrical mixing chamber. The plow blade rotates on the horizontal axis of the chamber with the edge of the blade close to the perimeter of the chamber. In addition to maintaining the silica in a fluidized state and uniformly dispersing the polymer particles throughout the silica to achieve a homogeneous blend, the plow blade is also believed to agglomerate the ultimate particles produced by high speed shearing blade(s), also present in the chamber, to achieve the desired final particle size. The speed of the plow blade required to maintain the silica in a fluidized form is typically from about 30 to about 200 revolutions per minute, and is dependent upon the capacity of the mixing chamber and the particle size range of the final powder. A speed of from 80 to 180 revolutions per minute is preferred using a 130 liter- capacity mixing chamber. The speed would be proportionately slower for a larger capacity mixer. The mixing chamber also contains at least one high speed chopping blade to provide the shearing force required to reduce the particle size of polydiorganosiloxane to a fine powder. A preferred embodiment of a mixing chamber contains at least one conical array of one to six blades rotating on a single shaft and ranging in diameter from 4 to 9 inches (10 to 23 cm), the smallest diameter blade being located closest to the mixer wall. It is believed that the speed of the chopping blade(s) should be between about 2000 and about 4000 revolutions per minute when it is desired to prepare silicone polymer powders of the present invention with a processing time of up to 30 minutes.

In accordance with the preferred method for preparing the silicone polymer powder (B), at least a portion of the reinforcing filler is maintained in a highly turbulent, fluidized state in the mixing apparatus by stirring or otherwise agitating the filler particles sufficiently to break apart agglomerates, entrap air or other gas between the filler particles and maintain the particles suspended in the mixing chamber. The suspended filler particles assume the characteristics of a fluidized bed with respect to the ability of the suspended filler particles to rapidly coat the particles of polydiorganosiloxane that are added to the mixing apparatus together with or shortly following addition of the filler. The additional ingredients described above can be added to the mixing chamber together with the filler or with the polydiorganosiloxane. However, if the alkoxysilane adhesion promoter (iii) is to be used, this ingredient should be added after the polydiorganosiloxane (i) and silica (ii) have already been mixed.

In accordance with a preferred method, particles of treated silica filler are fluidized and heated to a temperature of greater than 100° C. before the polydiorganosiloxane is added. To avoid or minimize the presence of gel particles and reduce processing time, the temperature within the mixing chamber is maintained at greater than 100° C. to about 200° C., preferably greater than 100° C. to 150° C., during the entire process for preparing the silicone polymer powder (B), which typically requires from 2 to 120 minutes, depending upon the amount of silica.

In a preferred embodiment of the present method and to reduce the capacity of the mixing chamber required to prepare a given amount of the silicone polymer powder, only a portion of the filler is added initially, due to the large increase in filler volume during fluidization. The remaining filler is initially placed in a hopper or other suitable dispensing container and allowed to drop into the chamber as the volume of silica initially present in the mixer decreases due to densification. This method of filler addition utilizes the full volume of the mixing chamber throughout the process of preparing the finely divided organosiloxane composition.

Component (C) of the present invention is a conventional phosphorus-based fire retardant having a boiling point, or decomposition point, of at least about 180° C. The latter stipulation is required for the purposes of the present invention since this component must be thoroughly compounded with the organic resin (A) and must not volatilize or degrade at the elevated process temperatures, as described infra.

The phosphorus-based fire retardant (C) is well known in the art as a fire retardant for plastics and textiles and may be selected from such compounds as red phosphorus; ammonium polyphosphates; halogenated alkyl phosphates and phosphonates, such as 2-chloroethanol phosphate (3:1), 1,3-dichloro-2-propanol phosphate and tris(2-chloroethyl)-phosphate; oligomeric phenylphosphonates of dihydric phenols; triaryl phosphates, such as tricresyl phosphate; alkyl diphenyl phosphates, such as isodecyl diphenyl phosphate and 2-ethylhexyl diphenyl phosphate; triphenyl phosphates, such as triphenyl phosphate; phosphonitrilics; phosphonium bromides; phosphine oxides; reactive organophosphorus monomers, such as bis(2-chloroethyl) vinylphosphonate; and various phosphorus-containing diols and polyols. Further details relating to these materials may be found in the section by E. D. Weil in *The Encyclopedia of Chemical Technology*, vol. 10, 3rd Edition, pages 396–419 (1980).

Preferably, component (C) is an ammonium polyphosphate having the general formula

$(NH_4PO_3)_n$ wherein n has a value such that the ammonium polyphosphate has a solubility in water of no more than about 5 weight percent at 25° C. These compounds are well known in the art and are available commercially from, e.g., Hoechst Celanese (Morristown, N.J.) and Monsanto (St. Louis, Mo.).

In addition to the above mentioned components, a number of additional ingredients can be added to the compositions of the present invention. These additional ingredients include but are not limited to extending fillers such as silicone resins, quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as halogenated hydrocarbons, alumina trihydrate, magnesium hydroxide, and other fire retardant (FR) materials.

A composition of the present invention may be prepared by thoroughly mixing from about 0.5 to about 25 parts by weight, preferably 1 to 15 parts, of the silicone polymer powder (B) and from about 5 to about 80, preferably 15 to 50 parts, of phosphorus-based fire retardant (C) with 100 parts by weight of resin (A). This mixing can be accomplished at elevated temperatures by any of the conventional methods used to disperse various components in high viscosity resins. The temperature and other conditions of such a mixing operation depends upon the particular resin selected and may be determined by routine experimentation by those skilled in the art. Preferably, the silicone polymer powder is premixed with the phosphorus-based fire retardant and this combination is then mixed with the resin. Examples of suitable mixing equipment include such machines as twin screw extruders and single screw extruders, inter alia.

After components (A) through (C) are thoroughly mixed, the resulting modified resin generally can be further processed by conventional techniques, such as extrusion, vacuum forming, injection molding, blow molding or compression molding, to fabricate plastic parts. When burned, these parts generally have a reduced rate of heat release and generate less smoke and carbon monoxide than corresponding unmodified molding. Such parts find utility in various industrial applications where a high degree of fire retardancy is desired, particularly wherein the above mentioned elements of combustion pose a threat to human life and/or substantial loss of property. Examples of these applications include window and wall coverings, electrical and electronic insulation components, such as motor, coil and transformer insulation; housings for various electrical and electronic equipment, such as machines computers and hand tools; structural members; furniture; automotive components, such as engine and interior structural components; and aircraft interior components, inter alia.

EXAMPLES

The following examples are presented to further illustrate the method and compositions of this invention, but are not to be construed as limiting the invention, which is delineated in the appended claims. All parts and percentages in the examples are on a weight basis and all measurements were obtained at 25° C., unless indicated to the contrary.

Example 1

A silicone rubber powder of the present invention was prepared by first treating a silica filler and then blending the treated filler with a polydimethylsiloxane gum as follows.

The mixing chamber of a 130 liter capacity Littleford Mixer/Granulator (Model FM 130 D; Littleford Bros., Inc., Florence, Ky.) was heated and maintained at a temperature of 135° C. Nitrogen was passed through the mixer chamber at a flow rate of 3.40 m$^3$/sec (120 cubic feet per hour) (CFH). The nitrogen flow rate was then reduced to 0.283 m$^3$/sec (10 CFH) and about half of a 31.95 parts charge of a fumed silica having a nominal surface area of 250 m$^2$/gram was added. The chopper and plow blades of the mixer were started (about 160 rpm for plow blade and about 3400 rpm for chopper blades) and 6.80 part of a hydroxy-terminated polydimethylsiloxane fluid having a viscosity of about 0.00004 m$^2$/sec (40 Cs) and an average degree of polymerization (DP) of about 8 was sprayed into the mixer chamber using an atomizer nozzle. After about one minute, 59.17 parts of a dimethylvinylsiloxy-terminated polydimethylsiloxane gum containing 0.142 mole percent of methylvinylsiloxane units and exhibiting a Williams plasticity number of about 150 was added to the mixer chamber. The remaining silica was then introduced in addition to 2.07 parts of an organosiloxane copolymer resin containing 7.2 mol percent of $CH_3SiO_{3/2}$ units, 24 mol percent of $(CH_3)_2SiO$ units, 3.2 mol percent of $(CH_3)_3SiO_{\frac{1}{2}}$ units, 15.4 mol percent of $(CH_2\!=\!CH)(CH_3)SiO$ units and 50 mol percent of $PhSiO_{3/2}$ units, wherein Ph hereinafter denotes a phenyl radical.

The nitrogen purge rate was increased to 3.40 m$^3$/sec (120 CFH) and the contents were mixed for an additional 5 minutes, whereupon 2 parts of an adhesion promoter, gamma-methacryloxy-propyltrimethoxysilane, was added. This silane was mixed in at the elevated temperature for about 10 minutes, after which the nitrogen flow was reduced to 0.28 m$^3$/sec (10 CFH) and the mixer was placed under vacuum ($\geq$23 in. Hg) for 15 minutes. The mixer was cooled to below 50° C. to result in a free-flowing "crumbly" silicone rubber powder.

Examples 2–10

The silicone powder (SP) prepared in Example 1, and two different ammonium polyphosphates (APP), were used to modify a polypropylene (PP) resin, the proportions being shown in the second column of Table 1. The polypropylene used in each case was ESCORENE TM 1012 (Exxon, Houston, Tex.). The APP used in Examples 5–8 was EXOLIT TM 422 (Hoechst-Celanese, Morristown, N.J.) and the APP used in Examples 9–10 was PHOS-CHEK TM P40 (Monsanto, St. Louis, Mo.). The modified PP blends were prepared by mixing the stated components in a Haake System 90 TW100 extruder (Haake/Fisons Instruments, Paramus, N.J.) wherein the extruder zone 1 was set at 190° C., zone 2 at 200° C., zone 3 at 210° C. and zone 4 at 220° C.; screw speed was 75 rpm. When the compositions contained both the SP and the APP, these two components were first tumble mixed and this combination was mixed with the PP in the extruder.

Each of the above extruded blends was cooled, chopped into pellets and fabricated into test bars measuring 12.7×3.2×100 mm using a Boy model 15S screw-type injection molding machine (Boy Machine Corp., Exton, Pa.). The burn properties of these test bars were evaluated using a cone calorimeter according to the method detailed in American Society for Testing and Materials standard ASTM E 1354-90. In summary, eight of the above described test bars were arranged side-by-side on an aluminum foil tray so as to present a burn surface of approximately 100 mm×100 mm and having a depth of 3.2 mm. The tray containing the sample was placed on the platform of a load cell. A truncated cone heater positioned above the sample was used to irradiate the sample surface at a controlled heat flux of 30 kW/m$^2$. Testing commenced with the removal of a heat shield to allow the incident radiant energy to impinge upon the exposed surface of the sample. A spark igniter placed between the cone heater and the sample was used to ignite the gases generated as a result of heating. These gases, as well as the smoke formed during the combustion, were drawn through the cone heater by an exhaust hood, the latter being connected to an exhaust blower through a duct. A gas probe in the duct sampled the combustion gases and was used to continuously monitor the formation of carbon monoxide using an infrared analyzer. Similarly, a helium-neon laser smoke meter within the duct was used to continuously measure the amount of smoke being formed as the sample burned, the smoke density reported herein being a direct indication thereof. The heat released during combustion of the sample was calculated from a continuous determination of the oxygen concentration in the exhaust stream and the flow rate thereof.

The burn characteristics of the modified PP resins were compared with the unmodified PP control (i.e., Example 1) and are reported in Table 1. The relative values for peak heat, carbon monoxide (CO) formation and smoke formation shown were calculated relative to the respective property of the control PP and are reported on a percentage basis in this table. Thus, for example, the relative peak heat release of the PP resin modified with only the silicone rubber powder in Example 4 was calculated by dividing the peak heat release of this sample by the peak heat release of the control. In addition, Izod impact test bars were similarly injection molded, notched and evaluated according to ASTM D 256, the results also being presented in Table 1 (units=foot-pounds/inch).

TABLE 1

| Example | Composition | Peak Heat (% of Control) | CO (% of Control) | Smoke (% of Control) | Impact (Ft-lb/in) |
|---|---|---|---|---|---|
| 2 | 100% PP (Control) | 100 | 100 | 100 | 0.821 |
| 3 | 99% PP 1% SP | 100 | 90 | 85 | — |
| 4 | 95% PP 5% SP | 55 | 40 | 77 | 0.675 |
| 5 | 70% PP 30% APP | 63 | 51 | 87 | 0.348 |
| 6 | 69% PP 30% APP 1% SP | — | — | — | 0.630 |
| 7 | 85% PP 15% APP | 68 | 66 | 93 | 0.366 |
| 8 | 82% PP 15% APP 3% SP | 49 | 61 | 107 | 0.702 |
| 9 | 70% PP 30% APP | 68 | 57 | 91 | 0.388 |
| 10 | 80% PP 15% APP 5% SP | 38 | 47 | 87 | 0.681 |

From the results presented in Table 1, it can be seen that, even though the fire retardant character was greatly improved with the addition of only APP (i.e., Examples 5, 7 and 9), the impact resistance of the PP resin deteriorated to less than half of its unmodified value (i.e., control Example 2). To the contrary, the addition of both the SP and the APP (i.e., Examples 6, 8 and 10) resulted in similar good fire retardant properties but at least three quarters of the impact strength of the virgin polymer was retained.

In addition to the above described benefits, it was also found that the compositions of the present invention required less energy to process. Thus, for example, the mixture of Example 6 required only 46% of the average torque necessary to extrude the mixture of Example 5 which did not contain the silicone powder. Moreover, the latter mixture tended to build up on the extruder screw while the former did not.

That which is claimed is:

1. A method for imparting fire retardancy to an organic resin (A), said resin being selected from the group consisting of organic thermoplastic resins and organic thermoset resins, said method comprising thoroughly dispersing in said organic resin
   (B) a silicone polymer powder and,
   (C) a phosphorus-based fire retardant to form a modified resin composition, said silicone polymer powder (B) having an average particle size of 1 to 1000 microns and consisting essentially of
      (i) 100 parts by weight of a polydiorganosiloxane polymer, and
      (ii) from 10 to 150 parts by weight of a silica filler.
2. The method according to claim 1, wherein said component (ii) is a treated silica filler.
3. The method according to claim 2, wherein said organic resin is a thermoplastic resin.
4. The method according to claim 3, wherein said polydiorganosiloxane (i) is a polydimethylsiloxane gum having at least one functional group selected from the group consisting of hydroxyl and vinyl.
5. The method according to claim 4, wherein said treated silica filler (ii) comprises a silica filler having a surface area of 50 to 400 square meters per gram treated with a hydroxy-terminated polydiorganosiloxane having a degree of polymerization of 2 to 100.
6. The method according to claim 4, wherein said silicone polymer powder further comprises from 0.5 to 15 parts by weight of an alkoxysilane adhesion promoter for each 100 parts by weight of said silicone polymer powder.
7. The method according to claim 6, wherein said treated silica filler (ii) comprises a silica filler having a surface area of 50 to 400 square meters per gram treated with a hydroxy-terminated polydiorganosiloxane having an average degree of polymerization of 2 to 100.
8. The method according to claim 7, wherein said alkoxysilane adhesion promoter is selected from the group consisting of gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.
9. The method according to claim 8, wherein said hydroxy-terminated polydiorganosiloxane has an average degree of polymerization of 2 to 10.
10. The method according to claim 1, wherein said component (C) is ammonium polyphosphate.
11. A modified resin composition comprising:
   (A) 100 parts by weight of an organic resin selected from the group consisting of organic thermoplastic resins and organic thermoset resins;
   (B) from 0.5 to 25 parts by weight of a silicone polymer powder, said silicone polymer powder having an average particle size of 1 to 1000 microns and consisting essentially of
      (i) 100 parts by weight of a polydiorganosiloxane polymer, and
      (ii) from 10 to 150 parts by weight of a silica filler; and
   (C) from 5 to 80 parts by weight of a phosphorus-based fire retardant.
12. The composition according to claim 11, wherein said component (ii) is a treated silica filler.
13. The composition according to claim 12, wherein said organic resin (A) is a thermoplastic resin.
14. The composition according to claim 13, wherein said polydiorganosiloxane (i) is a polydimethylsiloxane gum having at least one functional group selected from the group consisting of hydroxyl and vinyl.
15. The composition according to claim 14, wherein said treated silica filler (ii) comprises a silica filler having a surface area of 50 to 400 square meters per gram treated with a hydroxy-terminated polydiorganosiloxane having a degree of polymerization of 2 to 100.

16. The composition according to claim 14, further comprising from 0.5 to 15 parts by weight of an alkoxysilane adhesion promoter for each 100 parts by weight of said silicone polymer powder (B).

17. The composition according to claim 16, wherein said treated silica filler (ii) comprises a silica filler having a surface area of 50 to 400 square meters per gram treated with a hydroxy-terminated polydiorganosiloxane having an average degree of polymerization of 2 to 100.

18. The composition according to claim 17, wherein said alkoxysilane adhesion promoter is selected from the group consisting of gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

19. The composition according to claim 18, wherein said hydroxy-terminated polydiorganosiloxane has an average degree of polymerization of 2 to 10.

20. A composition according to claim 11, wherein said silicone polymer powder is prepared by mixing
   (i) 100 parts by weight of a polydiorganosiloxane polymer, and
   (ii) 10 to 150 parts by weight of a silica filler, said mixing being carried out in a temperature range of greater than 100° C. to 200° C. and under sufficient shear to impart an average particle size of 1 to 1000 microns to said silicone polymer powder.

21. The composition according to claim 11, wherein 1 to 15 parts by weight of said silicone polymer powder (B) is combined with 100 parts by weight of said organic resin (A).

22. The composition according to claim 11, wherein 1 to 15 parts by weight of said silicone polymer powder (B) and 15 to 50 parts by weight of said phosphorus-based fire retardant (C) are combined with 100 parts by weight of said organic resin (A).

23. The composition according to claim 12, wherein 1 to 15 parts by weight of said silicone polymer powder (B) and 15 to 50 parts by weight of said phosphorus-based fire retardant (C) are combined with 100 parts by weight of said organic resin (A).

24. The composition according to claim 11, wherein said component (C) is ammonium polyphosphate.

* * * * *